United States Patent
Kristinsson et al.

(10) Patent No.: US 9,331,973 B1
(45) Date of Patent: May 3, 2016

(54) AGGREGATING CONTENT ASSOCIATED WITH TOPICS IN A SOCIAL NETWORK

(71) Applicant: LinkedIn Corporation, Mountain View, CA (US)

(72) Inventors: Andri H. Kristinsson, San Francisco, CA (US); Jeba S. Emmanuel, Mountain View, CA (US); Jess D. Venticinque, San Francisco, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/701,314

(22) Filed: Apr. 30, 2015

(51) Int. Cl.
| | |
|---|---|
| *G06F 15/16* | (2006.01) |
| *H04L 12/58* | (2006.01) |
| *G06F 17/30* | (2006.01) |
| *G06F 17/24* | (2006.01) |
| *H04L 29/06* | (2006.01) |

(52) U.S. Cl.
CPC ............. *H04L 51/32* (2013.01); *G06F 17/241* (2013.01); *G06F 17/3053* (2013.01); *H04L 65/403* (2013.01)

(58) Field of Classification Search
CPC ......... G06N 5/02; G06N 5/022; G06Q 50/01; H04L 51/32; H04L 65/403; G06F 17/241; G06F 17/3053
See application file for complete search history.

(56) References Cited

U.S. PATENT DOCUMENTS

| | | | | |
|---|---|---|---|---|
| 6,901,394 B2 * | 5/2005 | Chauhan | ................ | G06N 5/043 706/46 |
| 6,938,068 B1 * | 8/2005 | Kraft | ...................... | G06Q 10/10 709/203 |
| 8,010,460 B2 * | 8/2011 | Work | ...................... | G06Q 10/00 705/319 |
| 8,019,637 B2 * | 9/2011 | Palestrant | .............. | G06Q 10/06 705/26.7 |
| 2005/0086290 A1 * | 4/2005 | Joyce | ..................... | G06Q 10/06 709/202 |
| 2005/0251499 A1 * | 11/2005 | Huang | .............. | G06F 17/30864 |
| 2006/0042483 A1 * | 3/2006 | Work | ...................... | G06Q 10/00 101/91 |
| 2007/0203996 A1 * | 8/2007 | Davitz | .................. | H04L 12/588 709/206 |
| 2008/0133671 A1 * | 6/2008 | Kaloboukis | ............. | H04L 12/58 709/206 |
| 2010/0030734 A1 * | 2/2010 | Chunilal | ........... | G06F 17/30867 707/770 |
| 2010/0262659 A1 * | 10/2010 | Christiansen | ......... | G06F 17/241 709/205 |
| 2011/0016179 A1 * | 1/2011 | Bechtel | ............. | G06F 17/30867 709/205 |
| 2012/0072855 A1 * | 3/2012 | Baldwin | ................ | G06Q 10/10 715/752 |

\* cited by examiner

*Primary Examiner* — Lance L Barry

(74) *Attorney, Agent, or Firm* — Park, Vaughan, Fleming & Dowler LLP

(57) ABSTRACT

In order to facilitate access to relevant information, a system may determine topics that are of interest based on skills of users in a social network of users and annotations associated with content in the social network. Then, the system may identify experts knowledgeable about the topics among the users in the social network. These experts may be invited to aggregate and edit the topic content. For a given topic, the system may provide, to a subset of the experts, documents with suggested topic content and presentation formats for the topics. Based on feedback from the subset of the experts (such as modifications to one or more of the documents and/or the presentation formats), the system may modify or revise the documents.

18 Claims, 5 Drawing Sheets

AGGREGATING CONTENT ASSOCIATED WITH TOPICS IN A SOCIAL NETWORK

BACKGROUND

1. Field

The described embodiments relate to techniques for aggregating content associated with topics. More specifically, described embodiments relate to techniques for using experts in a social network to aggregate content associated with topics.

2. Related Art

The popularity of the Internet has resulted in a significant increase in the amount of information available to individuals. Search engines are a common tool to help individuals sort through and identify relevant or interesting information for a particular topic. For example, an individual may provide a search query to a search engine, which then compares the search query (or a search expression based on the search query) to an indexed corpus of documents (such as content on web pages and websites on the Internet), which may include a wide variety of information. Based on matches between documents in the corpus and the search query (or the search expression), the search engine then returns a set of results, including one or more potentially relevant documents.

However, even with the help of search engines, many individuals are overloaded with information. For example, it is often difficult for individuals to determine the relative merit or quality of different documents in a set of results provided by a search engine. This is frustrating for individuals, and degrades the quality of their user experience.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to facilitate access to content within a social network, the content may be divided into topics based on skills of users in the social network and annotations associated with the content. Then, experts knowledgeable about the topics among the users in the social network may be identified. These experts may be invited to aggregate, edit and/or otherwise maintain the topic content.

For a given topic, e.g., a system may provide, to a subset of the experts, documents with suggested topic content and presentation formats for the topics. Based on feedback from the subset of the experts (such as modifications to one or more of the documents and/or the presentation formats), the system may modify or revise the documents.

In this way, a system that hosts the social network may leverage the users of the social network to: identify topics that are of interest to them, provide relevant content, and (as needed) modify the topic content and/or the presentation formats. By dynamically revising the resulting aggregated topic content, this knowledge-aggregation technique may increase the likelihood that the topic content is interesting or relevant to the users, and may provide indications to the users as to the relative importance of the topic content. Consequently, the knowledge-aggregation technique may reduce the information overload that many users experience, which may reduce user frustration, improve the user experience and increase user engagement with or use of the social network and/or the system hosting the social network. In other embodiments, the knowledge-aggregation technique is used with some other type of repository of information.

In the discussion that follows, an individual or a user may be a person (for example, an existing user of the social network or a new user of the social network). Also, or instead, the knowledge-aggregation technique may be used by an organization, a business, and/or a government agency. Furthermore, a 'business' should be understood to include for-profit corporations, non-profit corporations, groups (or cohorts) of individuals, sole proprietorships, government agencies, partnerships, etc.

Figure 1:
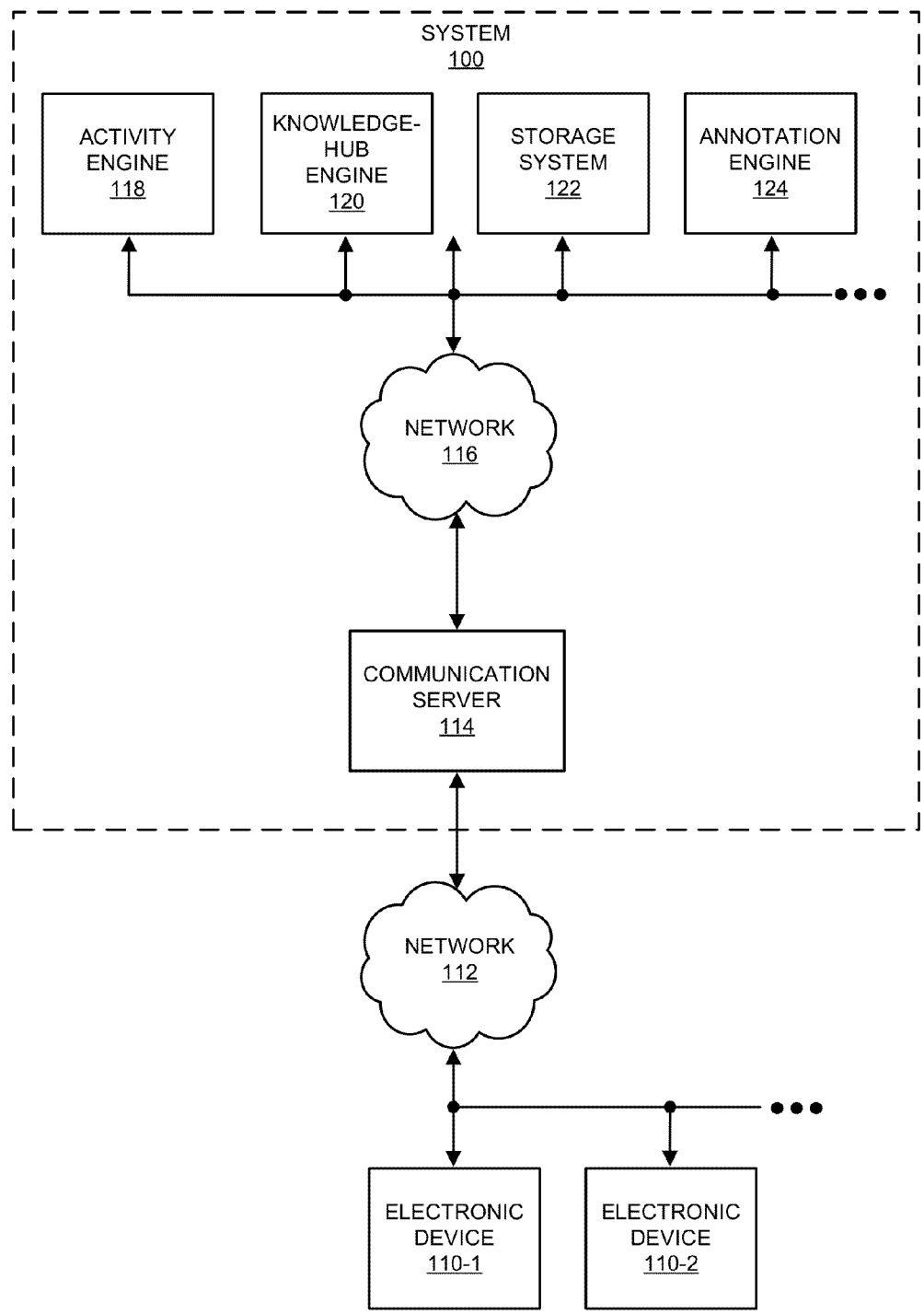
FIG. 1 is a block diagram illustrating a system used to aggregate topic content in accordance with an embodiment of the present disclosure.

We now describe embodiments of the system and its use. FIG. 1 presents a block diagram illustrating a system 100 that performs the knowledge-aggregation technique. In this system, users of electronic devices 110 may use a software product, such as instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

Using one of electronic devices 110 (such as electronic device 110-1) as an illustrative example, a user of electronic device 110-1 may use the software application to interact with other users in a social network (and, more generally, a network of users), such as a professional social network, which facilitates interactions among the users. Note that each of the users of the software application may have an associated user profile that includes personal and professional characteristics and experiences, which are sometimes collectively referred to as 'attributes' or 'characteristics.' For example, a user profile may include: demographic information (such as age and gender), geographic location, work industry for a current employer, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include: log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, inter-relationships, and/or connections.

In particular, when using the software application, the users may post content or data items in the social network (which are sometimes referred to as 'user posts'), such as: text, pictures, video, graphics, documents or files, presentations, etc. In addition, the users may post comments on other users' posts and/or about other users (such as endorsing the skill of another user in a particular area or topic). For example, a user may indicate that they like a user post or may provide feedback about the user post (sometimes referred to as a 'tag' or an 'annotation'). In general, user posts and/or comments may include: verbal, written, and/or recorded information. Note that the user posts or comments may be communicated to other users via the software application that executes in the environment of electronic devices 110.

Moreover, the users providing the posts may include so-called 'influencers,' who interact with multiple other users in the social network and may be represented in the social graph by nodes having multiple edges. In some embodiments, influencers are users who have the largest number of edges or connections in the social graph or a number of edges that exceeds a threshold value (such as the top 10% of the users). Alternatively or additionally, influencers may be dynamically identified based on how active they are in using the social network (how many posts or comments they provide, the content they provide, etc.), the number of other users that like or recommend comments or content from a particular user (e.g., the number of followers), their reputation for a particular skill or a particular topic (such as the number of other users that recommend the particular user for their skill or knowledge of a topic), etc.

Over time, via network 116, an activity engine 118 in system 100 may aggregate the user posts, the associated comments and, more generally, the user interactions with each other in the social network. Then, activity engine 118 may store the aggregated information in a data structure, which is stored in a computer-readable memory, such as storage system 122 that may encompass multiple devices, i.e., a large-scale storage system.

Subsequently, knowledge-hub engine 120 may determine topics based on skills of the users in the social network of users and annotations associated with the user-provided content in the social network and/or content provided by third parties (including individuals and/or organizations that are external to the social network). For example, the intersection or overlap between the most popular tags or annotations (such as the top N annotations) provided by the users and/or system 100 (such as by annotation engine 124, which may generate annotations) for the content, and the skills of the users (as indicated in their profiles) may be used by knowledge-hub engine 120 to determine the topics.

In some embodiments, knowledge-hub engine 120 uses predefined key words associated with different skills to determine matches with the annotations, so that the most popular topics can be identified based on the most-popular annotations. For example, keywords such as 'semiconductor' and 'integrated circuit' may be associated with a particular skill, such as electrical engineering. Alternatively, a keyword such as 'entrepreneur' may be associated with a particular skill, such as business or finance. These skills may be matched with annotations associated with documents, such as annotations in a scientific article or an employment opportunity.

Then, knowledge-hub engine 120 may identify experts knowledgeable about the topics among the users in the social network. For example, the experts may be identified by their reputations in the social network, based on the number of recommendations or endorsements they received from other users for their skills or knowledge about particular topics, identities of other users who recommended or endorsed them, and/or their influence in the social network (e.g., based on the number of posts or comments they provide, the number of likes their comments receive from other users, and/or other user activities in the social network). Thus, the experts may be influencers in the social network.

In some embodiments, endorsements and activities of the users of the social network are used by knowledge-hub engine 120 to generate expertise or reputation scores for the users, and knowledge-hub engine 120 uses the reputation scores (e.g., by identifying those scores that exceed a threshold value) to identify the experts. Note that their reputation scores may indicate the influence of the users in the social network.

Moreover, knowledge-hub engine 120 may, via communication server 114, provide messages or invitations to the identified experts. In particular, the messages may invite the experts to aggregate and edit (or curate) the topic content, where given topic content for a given topic includes a subset of the content, including content provided by the users of the social network and/or third parties external to the social network. Note that the content may include: facts, articles, presentations, photographs, text, video, audio files, opinions, documents (such as web pages or websites), résumés, employment information (such as job openings), research information (such as scientific papers), etc.

Next, knowledge-hub engine 120 may, via communication server 114, receive responses to the messages from at least a subset of the experts. For example, the subset of the experts may accept the invitations. As described further below with reference to FIG. 4, in response knowledge-hub engine 120 may provide to the subset of the experts, via communication server 114, documents with suggested topic content (i.e., content that the engine suggests adding to the topic), presentation formats for the topics (such as the look and feel of the content when presented), and/or other information.

Furthermore, knowledge-hub engine 120 may subsequently receive, via communication server 114, modifications to the documents from the subset of the experts. Based on the modifications, knowledge-hub engine 120 may revise the documents and/or the presentation format. Note that modifications to a given document for a given topic may include: adding new topic content in the social network, adding a link to topic content external to the social network, removing at least some of the suggested topic content, reordering the suggested topic content, renaming topic content, and/or defining a sub-category of the given topic in the presentation formats.

Alternatively or additionally, based on the response from the experts, knowledge-hub engine 120 may suggest modifications to the content for a topic (either manually or automatically). For example, when an expert selects content to include in a topics from the set of content suggested by knowledge-hub engine 120, that action may be used to improve the technique used to suggest content for topics. Thus, the behavior of the expert can be used to fine tune the logic that is used to suggest content. In another example, knowledge-hub engine 120 may rank suggested content based on logical rules or criteria (which effectively filter the suggested content) and when an expert actually uses knowledge-hub engine 120, the logical can be improved. In some embodiments, knowledge-hub engine 120 recommends content for the topic 'security,' and one of the criteria is to return all content uploaded by users in a particular country. Based on the behavior of the experts, knowledge-hub engine 120 may determine that this criteria is not adding a lot of value, e.g., the experts may not be selecting the suggested content to knowledge-hub engine 120. Consequently, knowledge-hub engine 120 may modify or remove the criteria from its list of criteria.

In some embodiments, knowledge-hub engine 120, via communication server 114: provides the revised documents to the users; receives feedback from the users about the modifications; and determines a subset of the modifications to accept based on the feedback. For example, the users (including the experts) may select or determine the subset of the modifications to accept by voting on the modifications (such as via explicit voting based on likes or shares and/or implicit voting based on views). Note that the feedback from the experts may have higher weight when determining the subset of the modifications to accept.

In these ways, the knowledge-aggregation technique may allow users (e.g., the topic experts) to identify topics, and dynamically aggregate and modify high-quality topic content. These capabilities may increase the relevance or usefulness of the topic content, which may improve the user experience with system 100 and the social network. This may result in increased engagement with or use of the social network, and thus may increase the revenue of a provider of the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

Figure 2:
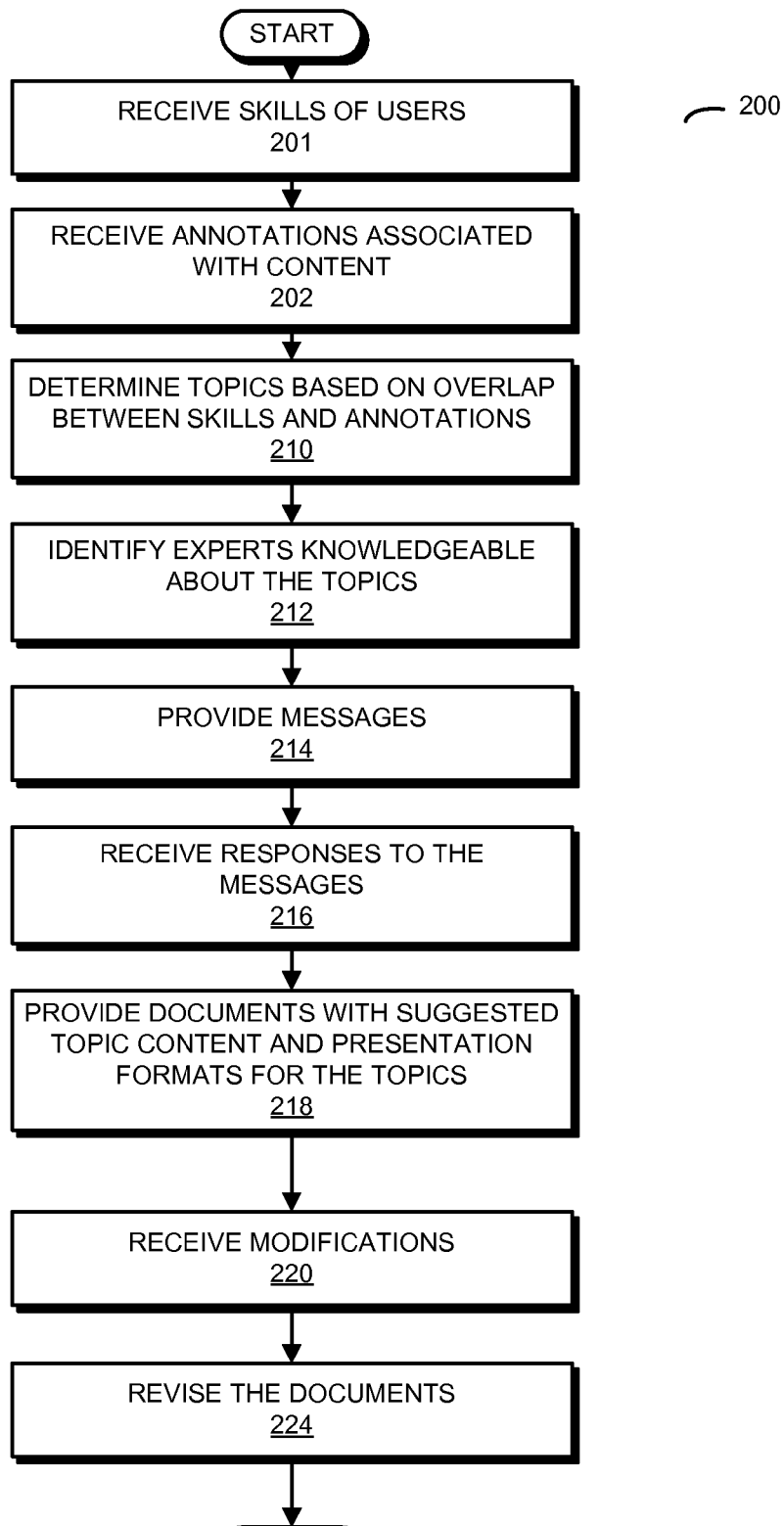
FIG. 2 is a flow chart illustrating a method for aggregating topic content in accordance with an embodiment of the present disclosure.

We now describe embodiments of the knowledge-aggregation technique. FIG. 2 presents a flow chart illustrating a method 200 for aggregating topic content, which may be performed by a computer system (such as system 100 in FIG. 1 or computer system 500 in FIG. 5). During operation, the computer system determines the topics (operation 210) based on skills of users in a social network of users, annotations associated with content in the social network, and/or other information (e.g., suggestions by experts). For example, the topics may be determined based on overlap of the user skills and the annotations (such as the top N annotations associated with the content). Note that the content may include presentations, résumés, employment information, research information, and/or other types of information.

Then, the computer system identifies experts knowledgeable about the topics (operation 212) among the users in the social network. For example, the experts may be identified based on reputation scores of the users in the social network, which may indicate influence of the users in the social network. Note that the reputation scores may be based on endorsements of the users in the social network. In an exemplary embodiment, a reputation score of a given user for a given topic is a weighted average of the endorsements received by the given user, with weights based on the skills (or reputation scores) of the users that provided the endorsements.

Moreover, the computer system provides messages (operation 214) inviting the experts to curate, or to aggregate and edit the topic content. Next, the computer system receives responses to the messages (operation 216) from at least a subset of the experts, and provides, to the subset of the experts, documents with suggested topic content and presentation formats for the topics (operation 218).

For example, the suggested topic content may be content within the social network that was identified or selected based on overlap or matches between a topic and annotations associated with the content (or keywords included in the content) and the topics or may be based on popularity of the content. The suggested presentation formats may be based on default presentation formats and/or a hierarchy or nesting of keywords in the suggested topic content that allows sub-categories to be identified (e.g., analog circuits are a sub-category of electrical engineering and thus may be indented and presented with different font size). Note that the documents may include web pages.

Furthermore, the computer system receives modifications (operation 220) to the documents from the subset of the experts, and revises the documents (operation 224) based on the modifications. The modifications to a given document for a given topic may include: adding new topic content in the social network, adding a link to topic content external to the social network, removing at least some of the suggested topic content, reordering the suggested topic content, renaming topic content, and/or defining a sub-category of the given topic.

Figure 4:
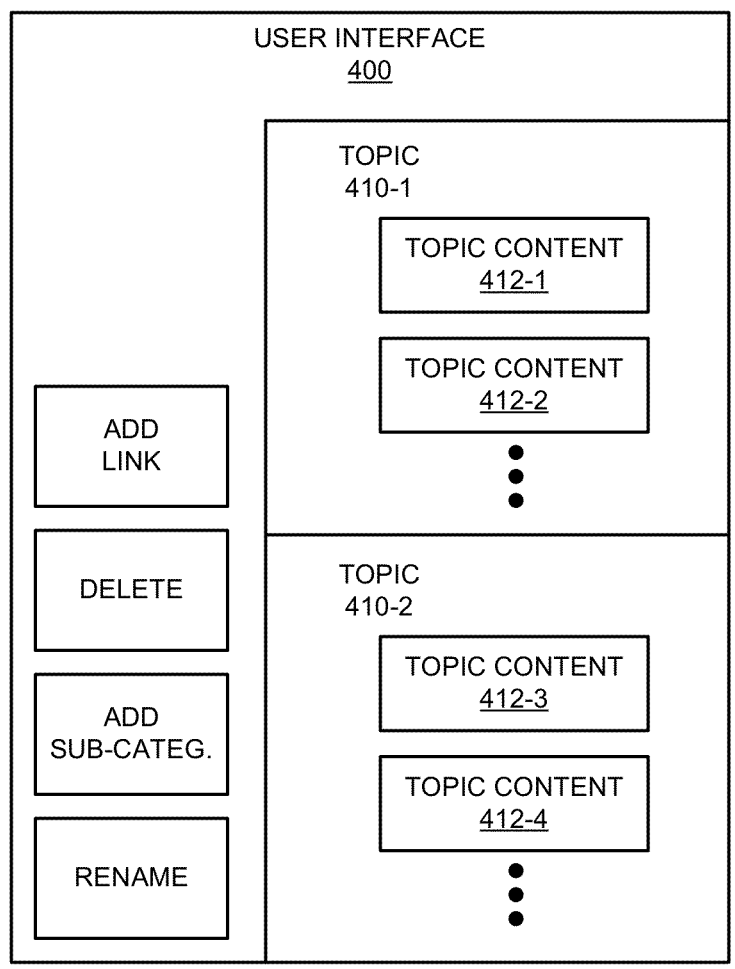
FIG. 4 is a drawing illustrating a user interface for presenting aggregated topic content in accordance with an embodiment of the present disclosure.

For example, as described further below with reference to FIG. 4, an expert may provide modifications by dragging and dropping or reordering the topic content for a particular topic that is presented in a user interface. Thus, the modifications may be provided by the experts based on their interactions with a user interface that displays the topic content with the presentation formats. Note that the content for the topics may be arranged in flat containers, and the experts may specify an arbitrary hierarchical structure for the content for the given topic based on a hierarchy of pointers to the containers where the topic content is stored or located in the computer system.

In some embodiments, the computer system optionally receives feedback (operation 222) from the users about the modifications, and the computer system revises the documents (operation 224) based on the modifications and the feedback. For example, the computer system may: provide the revised documents to the users; receive the feedback from the users about the modifications; and determine a subset of the modifications to accept based on the feedback. Note that the feedback from the experts may have higher weight when determining the subset of the modifications to accept. For example, the feedback by an expert may have a 5-10× larger weight in a weighted average of the feedback than the feedback from a non-expert user (or a user that is not an expert for a particular topic).

Figure 3:
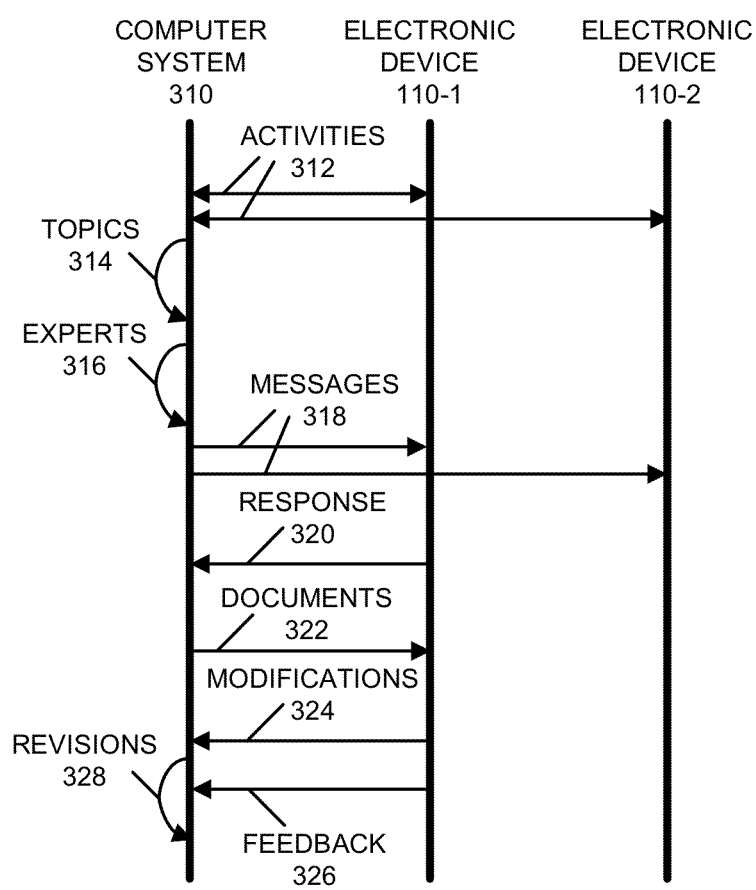
FIG. 3 illustrates communication between the electronic devices of FIG. 1 in accordance with an embodiment of the present disclosure.

In an exemplary embodiment, method 200 is implemented using one or more electronic devices and at least one server (and, more generally, a computer system), which communicate through a network, such as a cellular-telephone network and/or the Internet (e.g., using a client-server architecture). This is illustrated in FIG. 3. During this method, computer system 310 (which may implement some or all of the functionality of system 100 in FIG. 1) may monitor activities 312 (or interactions) of the users of electronic devices 110 in the social network. Then, computer system 310 may determine topics 314 based on the skills of the users in the social network and annotations associated with the content in the social network.

Moreover, computer system 310 may identify experts 316 knowledgeable about topics 314 among the users in the social network. For example, activities 312 may include endorsements that computer system 310 uses to determine influence of the users and/or reputation scores in the social network, which are then used by computer system 310 to identify experts 316.

Next, computer system 310 may provide messages 318 inviting experts 316 to aggregate and edit the topic content for topics 314, and computer system 310 may receive responses (such as response 320) to messages 318 from at least a subset of experts 316. For example, the user of electronic device 110-1 may be an expert, and may accept the invitation via response 320.

Furthermore, computer system 310 may provide, to the subset of experts 316, documents 322 with suggested topic content and presentation formats for topics 314. Note that providing documents 322 may include providing links to documents 322 and, more generally, information specifying the locations of documents 322 or where (in a network) documents 322 can be accessed.

Additionally, computer system 310 may receive, from the subset of experts 316, modifications 324 to documents 322, and may revise 328 documents 322 (and/or the associated presentation formats) based on modifications 324.

In some embodiments, computer system 310 optionally receives feedback 326 from the users about modifications 324, and computer system 310 revises 328 documents 322 based on modifications 324 and feedback 326. For example, feedback 326 may be based on voting by the users about modifications 324.

In some embodiments of method 200 (FIGS. 2 and 3), there may be additional or fewer operations. Moreover, the order of the operations may be changed, and/or two or more operations may be combined into a single operation. Note that in some embodiments, the modifications made by at least some of the experts to the topic content and/or the presentation formats are anonymous.

We now describe embodiments of a user interface (which is sometimes referred to as a 'knowledge hub') that displays the topic content. FIG. 4 presents a drawing illustrating a user interface 400 for presenting aggregated topic content 412 associated with topics 410. In particular, user interface 400 includes topics 410 with topic content 412 (such as documents or links to documents in a social network and/or external to the social network) arranged according to presentation formats. Note that the presentation formats of topics 410 and topic content 412 may include: ordering of the topic content, sub-categories, headers for or names of sub-categories, font size, font color, etc.

Figure 5:
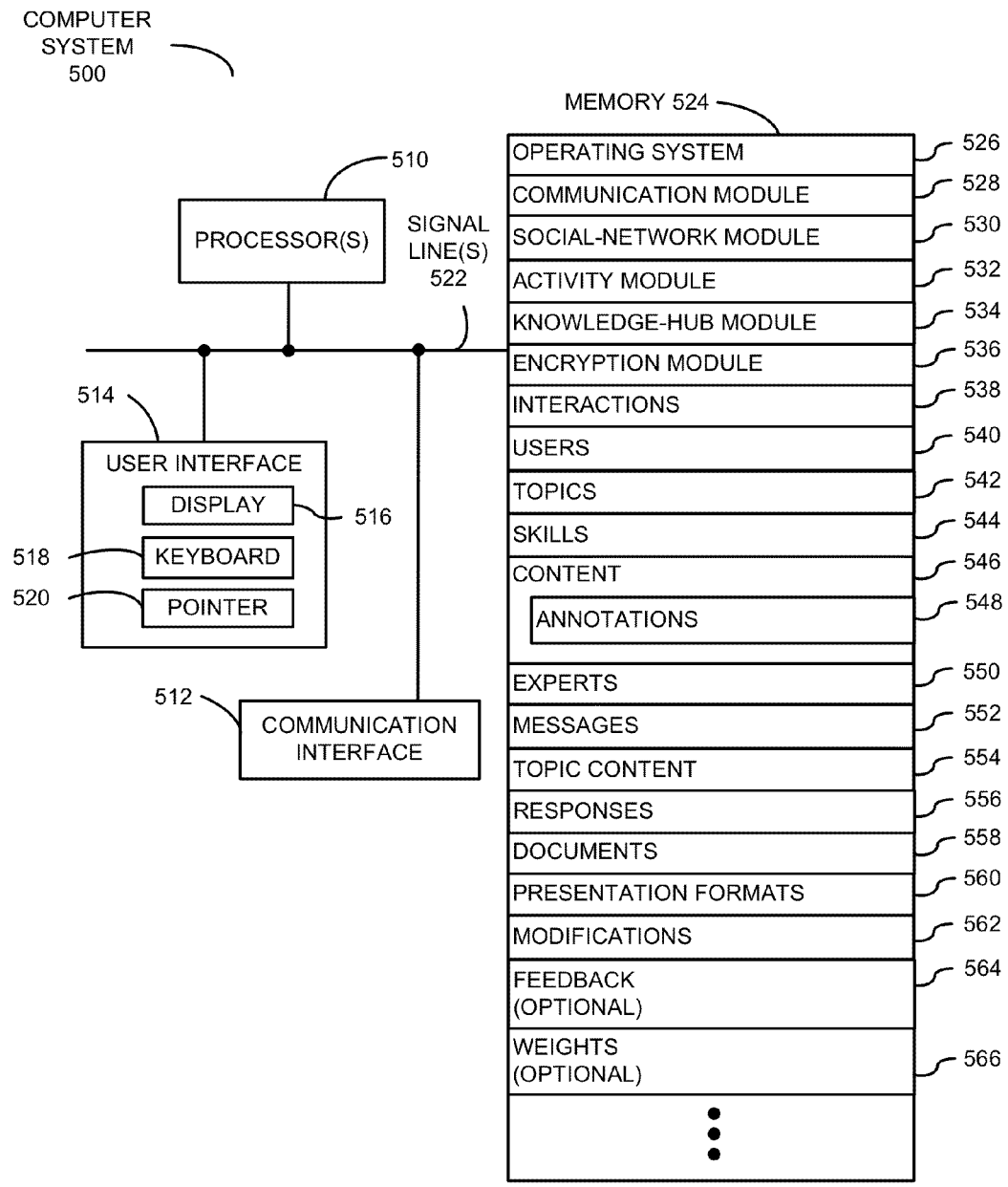
FIG. 5 is a block diagram illustrating a computer system that performs the method of FIGS. 2 and 3 in accordance with an embodiment of the present disclosure.

We now describe embodiments of a computer system for performing the knowledge-aggregation technique and its use. FIG. 5 presents a block diagram illustrating a computer system 500 that performs method 200 (FIGS. 2 and 3), such as system 100 in FIG. 1 or computer system 310 in FIG. 3. Computer system 500 includes one or more processing units or processors 510 (which are sometimes referred to as 'processing modules'), a communication interface 512, a user interface 514, memory 524, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516 (such as a touchscreen), a keyboard 518, and/or a pointer 520 (such as a mouse).

Memory 524 in computer system 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500.

Memory 524 may also include multiple program modules, including: social-network module 530, activity module 532, knowledge-hub module 534, and/or encryption module 536. Note that one or more of these program modules (or sets of instructions) may constitute a computer-program mechanism.

During operation of computer system 500, social-network module 530 facilitates interactions 538 among users 540 via communication module 528 and communication interface 512. These interactions may be tracked by activity module 532, and may include user posts, comments, and/or other activities. Then, knowledge-hub module 534 may determine topics 542 based on skills 544 of users 540 of in the social network and annotations 548 associated with content 546 in the social network.

Moreover, knowledge-hub module 534 may identify experts 550 knowledgeable about topics 542 among users 540 in the social network. For example, interactions 538 may include endorsements that knowledge-hub module 534 uses to determine influence of users 540 and/or reputation scores in the social network, which are then used by knowledge-hub module 534 to identify experts 550.

Next, knowledge-hub module 534 may provide, via communication module 528 and communication interface 512, messages 552 inviting experts 550 to aggregate and edit topic content 554 (in content 546 associated with topics 542), and knowledge-hub module 534 may receive, via communication interface 512 and communication module 528, responses 556 to messages 552 from at least a subset of experts 550.

Furthermore, knowledge-hub module 534 may provide, to the subset of experts 550, documents 558 (or links to documents 558) with suggested topic content 554 and presentation formats 560 for topics 542.

Additionally, knowledge-hub module 534 may receive, from the subset of experts 550, modifications 562 to documents 558, and may revise documents 558 (and/or the associated presentation formats 560) based on modifications 562 and/or optional feedback 564 from users 540 about modifications 562. In some embodiments, knowledge-hub module 534 uses optional weights 566 associated with users 540 when considering or using optional feedback 564 for a particular topic, such as a weighted average of optional feedback 564. As but one example, one or more experts 550 for the particular topic may have weights of 1 and non-expert users for this topic may have weights of 0.1, 0.2 or 0.5.

Because information in computer system 500 may be sensitive in nature, in some embodiments at least some of the data stored in memory 524 and/or at least some of the data communicated using communication module 528 is encrypted using encryption module 536.

Instructions in the various modules in memory 524 may be implemented in a high-level procedural language, an object-oriented programming language, and/or in an assembly or machine language. Note that the programming language may be compiled or interpreted, e.g., configurable or configured, to be executed by the one or more processors.

Although computer system 500 is illustrated as having a number of discrete items, FIG. 5 is intended to be a functional description of the various features that may be present in computer system 500 rather than a structural schematic of the embodiments described herein. In practice, and as recognized by those of ordinary skill in the art, the functions of computer system 500 may be distributed over a large number of servers or computers, with various groups of the servers or computers performing particular subsets of the functions. In some embodiments, some or all of the functionality of computer system 500 is implemented in one or more application-specific integrated circuits (ASICs) and/or one or more digital signal processors (DSPs).

Computer systems (such as computer system 500), as well as electronic devices, computers and servers in system 100 (FIG. 1), may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 112 (FIG. 1) may include: the Internet, World Wide Web (WWW), an intranet, a cellular-telephone network, LAN, WAN, MAN, or a combination of networks, or other technology enabling communication between computing systems.

System 100 (FIG. 1) and/or computer system 500 may include fewer components or additional components. Moreover, two or more components may be combined into a single component, and/or a position of one or more components may be changed. In some embodiments, the functionality of system 100 (FIG. 1) and/or computer system 500 may be implemented more in hardware and less in software, or less in hardware and more in software, as is known in the art.

While a social network has been used as an illustration in the preceding embodiments, more generally the knowledge-aggregation technique may be used to aggregate topic content in a wide variety of applications or systems. Moreover, the knowledge-aggregation technique may be used in applications where the communication or interactions among different entities (such as people, organizations, etc.) can be described by a social graph. Note that the people may be loosely affiliated with a website (such as viewers or users of the website), and thus may include people who are not formally associated (as opposed to the users of a social network who have user accounts). Thus, the connections in the social graph may be defined less stringently than by explicit acceptance of requests by individuals to associate or establish connections with each other, such as people who have previously communicated with each other (or not) using a communication protocol, or people who have previously viewed each other's home pages (or not), etc. In this way, the knowledge-aggregation technique may be used to expand the quality of interactions and value-added services among relevant or potentially interested people in a more loosely defined group of people.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-system-implemented method for aggregating topic content, the method comprising:

providing a user-interface for an online social network website to one or more user computers for installation on the one or more user computers;

receiving, at a transmission server for the provider of the online social-network website, one or more skills of users in the social network, wherein the one or more skills of each of the users is indicated in the profile of the user, and wherein the transmission server comprises a processor and a memory;

receiving, at the transmission server, annotations associated with content in the social network, wherein each annotation associated with content indicates a feedback provided by a user in the social network regarding the content;

storing the received one or more skills of a user in association with the profile of the user in a partitioned user profile data section of the memory;

storing the received annotations associated with content in a partitioned content annotations data section of the memory;

determining, using the processor, a set of topics based on an overlap between the received skills and the received annotations;

using the processor, identifying experts knowledgeable about the set of topics among the users in the social network;

transmitting, over a data channel, from the transmission server of the provider of the social network to the one or more user computers, one or more messages inviting the experts to aggregate and edit the topic content, wherein given topic content for a given topic in the set of topics includes a subset of the content;

receiving over the data channel, at the transmission server from the one or more user computers, responses to the messages from at least a subset of the experts;

providing over the data channel, from the transmission server to the one or more user computers associated with the subset of the experts, documents with suggested topic content and presentation formats for the topics in the set of topics;

receiving over the data channel, at the transmission server, from the one or more user computers, from the subset of the experts, modifications to the documents;

revising the documents based on the modifications;

storing the revised documents in the memory associated with the transmission server; and transmitting one or more of the stored documents over the data channel, from the transmission server to a user computer, wherein the user computer is associated with a member of the social network, and wherein the transmitted document is available for display on the user computer using the user-interface for the social network application.

2. The method of claim 1, wherein the annotations are a top N annotations associated with the content.

3. The method of claim 1, wherein the experts are identified based on reputation scores of the users in the social network.

4. The method of claim 3, wherein the reputation scores indicate influence of the users in the social network.

5. The method of claim 3, wherein the reputation scores are based on endorsements of the users in the social network.

6. The method of claim 1, wherein the documents include web pages.

7. The method of claim 1, wherein the content includes one of: presentations, résumés, employment information, and research information.

8. The method of claim 1, wherein the modifications to a given document for a given topic in the set of topics include at least one of: adding new topic content in the social network, adding a link to topic content external to the social network, removing at least some of the suggested topic content, reordering the suggested topic content, renaming topic content, and defining a sub-category of the given topic.

9. The method of claim 1, wherein the method further comprises:
   providing the revised documents to the users;
   receiving feedback from the users about the modifications; and
   determining a subset of the modifications to accept based on the feedback.

10. The method of claim 9, wherein the feedback from the experts has higher weight than the feedback from users who are not experts when determining the subset of the modifications to accept.

11. An apparatus, comprising:
   one or more processors;
   memory; and
   a program module, wherein the program module is stored in the memory and, during operation of the apparatus, is executed by the one or more processors to aggregate topic content, the program module including:
      instructions for providing a user-interface for an online social network website to one or more user computers for installation on the one or more user computers;
      instructions for receiving, at a transmission server for the provider of the online social-network website, one or more skills of users in the social network, wherein the one or more skills of each of the users is indicated in the profile of the user, and wherein the transmission server comprises a processor and a memory;
      instructions for receiving, at the transmission server, annotations associated with content in the social network, wherein each annotation associated with content indicates a feedback provided by a user in the social network regarding the content;
      instructions for storing the received one or more skills of a user in association with the profile of the user in a partitioned user profile data section of the memory;
      instructions for storing the received annotations associated with content in a partitioned content annotations data section of the memory;
      instructions for determining, using the processor, a set of topics based on an overlap between the received skills and the received annotations;
      instructions for identifying, using the processor, experts knowledgeable about the set of topics among the users in the social network;
      instructions for transmitting, over a data channel, from the transmission server of the provider of the social network to the one or more user computers, one or more messages inviting the experts to aggregate and edit the topic content, wherein given topic content for a given topic in the set of topics includes a subset of the content;
      instructions for receiving over the data channel, at the transmission server from the one or more user computers, responses to the messages from at least a subset of the experts;
      instructions for providing over the data channel, from the transmission server to the one or more user computers, to the subset of the experts, documents with suggested topic content and presentation formats for the topics in the set of topics;
      instructions for receiving over the data channel, at the transmission server, from the one or more user computers, from the subset of the experts, modifications to the documents;
      instructions for revising the documents based on the modifications;
      instructions for storing the revised documents in the memory associated with the transmission server; and
      instructions for transmitting one or more of the stored documents over the data channel, from the transmission server to a user computer, wherein the user computer is associated with a member of the social network, and wherein the transmitted document is available for display on the user computer using the user-interface for the social network application.

12. The apparatus of claim 11, wherein the annotations are a top N annotations associated with the content.

13. The apparatus of claim 11, wherein the experts are identified based on reputation scores of the users in the social network.

14. The apparatus of claim 13, wherein the reputation scores indicate influence of the users in the social network.

15. The apparatus of claim 13, wherein the reputation scores are based on endorsements of the users in the social network.

16. The apparatus of claim 11, wherein the documents include web pages.

17. The apparatus of claim 11, wherein the content includes one of: presentations, résumés, employment information, and research information.

18. A system, comprising:
   a processing module comprising a non-transitory computer readable medium storing instructions that, when executed, cause the system to:
      provide a user-interface for an online social network website to one or more user computers for installation on the one or more user computers;
      receive, at a transmission server for the provider of the online social-network website, one or more skills of a set of users in the social network wherein the one or more skills of each of the users is indicated in the profile of the user, and wherein the transmission server comprises a processor and a memory;
      receive, at the transmission server, annotations associated with content in the social network, wherein each annotation associated with content indicates a feedback provided by a user in the social network regarding the content;
      store the received one or more skills of a user in association with the profile of the user in a partitioned user profile data section of the memory;

store the received annotations associated with content in a partitioned content annotations data section of the memory;

determine, using the processor, a set of topics based on an overlap between the received skills and the received annotations;

identify, using the processor, experts knowledgeable about the set of topics among the users in the social network;

transmit, over a data channel, from the transmission server of the provider of the social network to the one or more user computers, one or more messages inviting the experts to aggregate and edit topic content, wherein given topic content for a given topic in the set of topics includes a subset of the content;

receive over the data channel, at the transmission server from the one or more user computers, responses to the messages from at least a subset of the experts;

provide over the data channel, from the transmission server to the one or more user computers, to the subset of the experts, documents with suggested topic content and presentation formats for the topics in the set of topics;

receive over the data channel, at the transmission server, from the one or more user computers, from the subset of the experts, modifications to the documents;

revise the documents based on the modifications;

store the revised documents in the memory associated with the transmission server; and transmit one or more of the stored documents over the data channel, from the transmission server to a user computer, wherein the user computer is associated with a member of the social network, and wherein the transmitted document is available for display on the user computer using the user-interface for the social network application.

* * * * *